United States Patent [19]

Berkey

[11] Patent Number: 4,915,467
[45] Date of Patent: Apr. 10, 1990

[54] METHOD OF MAKING FIBER COUPLER HAVING INTEGRAL PRECISION CONNECTION WELLS

[75] Inventor: George E. Berkey, Pine City, N.Y.
[73] Assignee: Corning Incorporated, Corning, N.Y.
[21] Appl. No.: 242,919
[22] Filed: Sep. 12, 1988
[51] Int. Cl.$^4$ ............................ G02B 6/26; G02B 6/42
[52] U.S. Cl. .................................................. 350/96.15
[58] Field of Search ........................... 350/96.15, 96.18

[56] References Cited

U.S. PATENT DOCUMENTS

| | | | |
|---|---|---|---|
| 4,679,894 | 7/1987 | Pavlath | 350/96.15 |
| 4,779,945 | 10/1988 | Hill et al. | 350/96.15 |
| 4,786,130 | 11/1988 | Georgiou et al. | 350/96.15 |
| 4,798,434 | 1/1989 | Dammann et al. | 350/96.15 |
| 4,834,481 | 5/1989 | Lawson et al. | 350/96.15 |

*Primary Examiner*—William L. Sikes
*Assistant Examiner*—Robert E. Wise
*Attorney, Agent, or Firm*—William J. Simmons

[57] ABSTRACT

An optical fiber coupler is formed by providing a glass tube having a longitudinal aperture. Two contiguous carbon tubes are disposed within the longitudinal aperture which is thereafter collapsed thereon. A glass capillary tube is formed by removing the carbon tubes. The tube can be stretched, overcoated with additional glass, and again stretched to form a precision capillary tube which is severed into coupler-length tubes. Two optical fibers, which are shorter in length than the aperture of a coupler-length tube, are centered in that aperture. The midregion of the resultant assembly is heated and collapsed about central portions of the fibers. The central region of the resultant coupler preform is heated and drawn to reduce the diameter thereof. The end regions of the aperture, which are not diminished in size by the aforementioned processing, function as receptacles into which optical fibers can be inserted to make connection to the coupler.

14 Claims, 2 Drawing Sheets

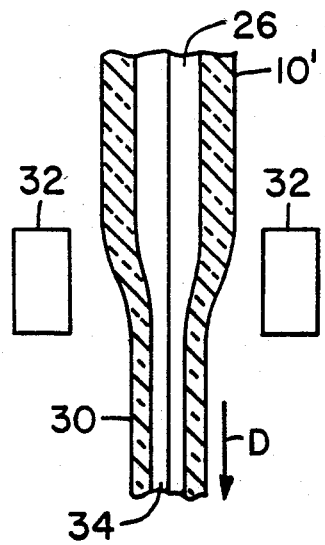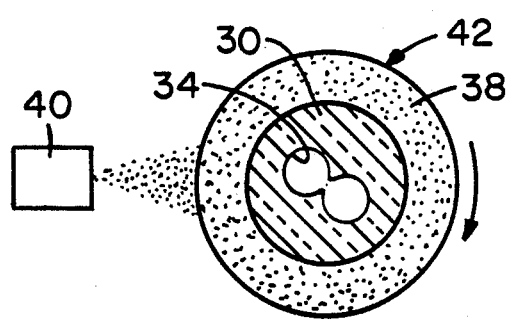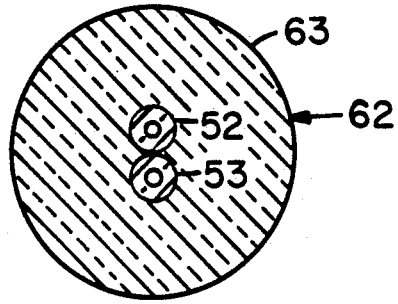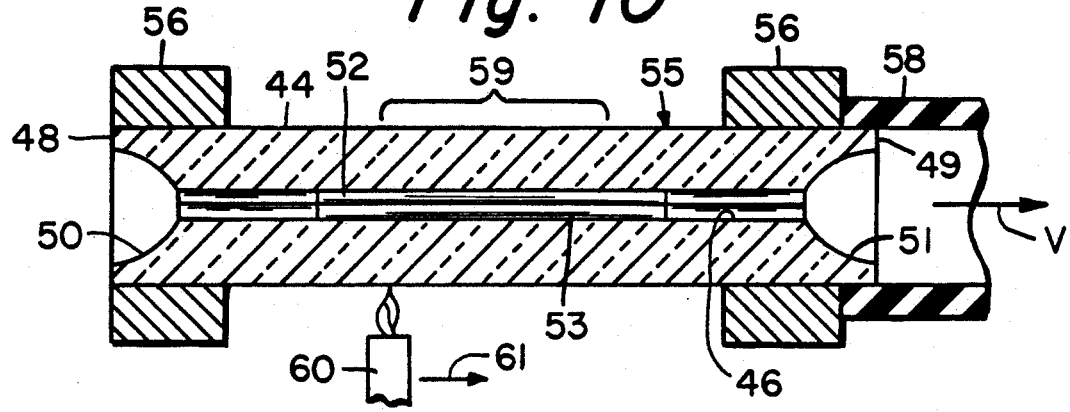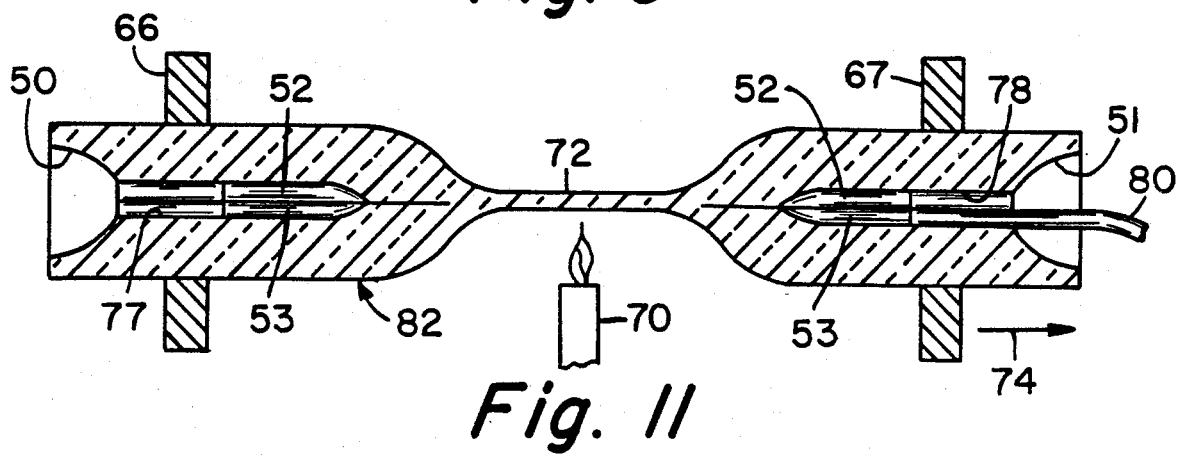

METHOD OF MAKING FIBER COUPLER HAVING INTEGRAL PRECISION CONNECTION WELLS

CROSS-REFERENCE TO RELATED APPLICATION

This application is related to my copending U.S. Pat. Application Ser. No. 204,620 entitled "Method of Making an Economical Fiber Coupler", filed June 9, 1988, and to copending U.S. Pat. Application Ser. No. 223,423 entitled "Method of Reproducibly Making Fiber Optic Coupler", filed July 25, 1988.

BACKGROUND OF THE INVENTION

Certain types of fiber optic systems require couplers in which at least a portion of the light propagating in an optical fiber is coupled to one or more output fibers. The present invention relates to such fiber optic couplers and more particularly to an improved method of making such fiber optic couplers.

It has been known that coupling occurs between two closely spaced cores in a multiple core device. The coupling efficiency increases with decreasing core separation and, in the case of single-mode cores, with decreasing core diameter. Couplers based on these principles are capable of low loss operation, i.e. they exhibit an excess loss of about 1 dB or less.

Reproducible methods of making rugged optical fiber couplers are disclosed in the aforementioned related applications Ser. No. 204,620 and Ser. No. 223,423. In accordance with the methods disclosed in those applications, a plurality of suitably prepared glass fibers, each having a core and cladding, are disposed within the longitudinal aperture of a glass capillary tube, the fibers extending beyond each end thereof. The midregion of the tube is heated and collapsed about the fibers to form a solid midregion, and a portion of the collapsed midregion is stretched to reduce the diameter thereof and to decrease the distance between the fiber cores, whereby optical power propagating in one fiber is coupled to the other.

Other methods employ the steps of twisting and fusing a plurality of fibers, or the steps of grinding or etching cladding from a plurality of fibers and then joining the resultant fibers in such a manner that the mode fields overlap.

Regardless of the process used, all commercial fiber couplers known today have optical fiber leads or "pigtails" extending from both ends thereof so that the coupler can be connected into a system using standard connectors or fusion splices. These pigtails can become tangled and can make transporting couplers a rather cumbersome task. Also, each pigtail must be coupled in the field to other fibers; this adds considerable cost to the implementation of the coupler. Furthermore, due to the lengths of the pigtails, the polarization of an optical signal injected into one pigtail might not be maintained as it propagates through that pigtail, the coupler, and the output pigtail. This effect on the polarization of the input signal is exacerbated when the connector and pigtails are subjected to temperature extremes.

SUMMARY OF THE INVENTION

It is, therefore, an object of the present invention to provide a method that overcomes the disadvantages of the prior art. Another object is to provide a method of making optical couplers which do not include optical fiber leads for making connection thereto. Yet another object is to provide an optical fiber coupler which does not include optical fiber leads for making connection thereto. A further object is to provide a method of making optical couplers that are easily handled and transported. Yet another object is to provide a low cost, efficient optical fiber coupler to which fibers may be easily connected in the field as well as in the shop. Another object is to provide a method of making an optical coupler that maintains the polarization of input signals applied thereto.

The method of the present invention results in the formation of an optical coupler that is adapted to be connected to system optical fibers having a predetermined outside diameter. The coupler comprises an elongated glass body having a solid midregion and first and second opposite end portions which respectively extend from the midregion to the first and second ends of the body. First and second longitudinal apertures respectively extend from the first and second ends of the body to the solid midregion, each of the longitudinal apertures having a cross-sectional shape that is a composite of a plurality of contiguous cylindrical apertures. At least two glass optical fibers, each having a core and cladding, extend through the midregion of the body and terminate between the midregion and the first and second ends of the body. The midregion of the body is in intimate contact with the fibers. The central portion of the midregion is of smaller diameter than the remainder of the midregion, whereby the cores of the fibers are more closely spaced in the central portion than in the remaining portions of the midregion. The sections of the apertures between the ends of the fibers and the first and second ends of the body form wells into which the system optical fibers can be inserted for connection to the coupler.

In accordance with the method of the present invention there is provided a glass coupler preform tube having first and second opposite end portions, a midregion, and a longitudinal aperture extending therethrough. The cross-sectional shape of the aperture is suitable for receiving a plurality of optical fibers in predetermined azimuthal locations. At least two glass optical fibers are disposed centrally within the longitudinal aperture. Each fiber length is shorter than the aperture, the ends of the fibers being disposed in those portions of the aperture between the midregion and the ends of the aperture. The midregion of the assembly so formed is heated to cause it to collapse around the central portions of the fibers, and the central portion of the resultant coupler preform is drawn down to a predetermined diameter whereby the axial regions of the fibers are brought closer to one another.

Collapse of the central portion the tube can be facilitated by creating a lower pressure within the aperture than at the outer surface thereof prior to the step of heating the tube.

The glass coupler preform tube can be formed as follows. An elongated, appropriately shaped carbon member is inserted into the aperture of a glass tube. For example, if two optical fibers are to be connected to each end of the coupler, the carbon member may comprise two carbon cylinders disposed in side-by-side relationship. The assembly so formed is heated to the softening point of the glass tube while the longitudinal aperture is evacuated. As the glass tube is heated, it collapses around the carbon member, the aperture wall of the glass tube assuming the exterior shape of the carbon member. The carbon member is removed, thereby forming a precision glass tube, the longitudinal aperture of which has a cross-sectional configuration identical to the removed carbon member. The resultant glass tube is preferably stretched or drawn to decrease its size while maintaining the shape of the aperture cross-section. The tube is severed into a plurality of precision glass coupler preform tubes each having a precision aperture having a plurality of cylindrical sections, each cylindrical section being slightly larger in diameter than a fiber that is to be connected to the coupler.

The carbon member preferably has at least one longitudinal aperture therethrough. The carbon member can be removed by flowing an oxygen containing gas through the longitudinal aperture thereof while the assembly so formed is subjected to heat.

Although low loss couplers can be made by collapsing the tube onto the fibers and drawing or stretching the midregion of the tube in a single heating operation, it is advantageous to separately perform these steps. If the tube is allowed to cool prior to heating it for the stretching operation, more control can be exerted over each step. A central portion of the solid collapsed midregion can be stretched, thereby keeping the stretched portions of the optical fibers completely enclosed in the matrix glass of the tube. This improved hermeticity is advantageous since it prevents the stretched portions of the fibers from being adversely affected by water and the like, a factor that can adversely modify the optical characteristics of the coupler.

BRIEF DESCRIPTION OF THE DRAWINGS

FIG. 7 is a schematic diagram illustrating the drawing of a rod-shaped mandrel from the device resulting from the process illustrated in FIG. 5.

FIG. 8 illustrates the application of an outer cladding to the mandrel.

FIG. 9 is a cross-sectional illustration of the collapsing of the midregion of a glass tube into which optical fibers have been inserted.

FIG. 10 is a cross-sectional view illustrating a solid midregion formed by collapsing the glass tube around the fibers.

FIG. 11 is a cross-sectional illustration of the drawing of the collapsed midregion of the preform of FIG. 9 to form a fiber coupler.

DESCRIPTION OF THE PREFERRED EMBODIMENTS

It is to be noted that the drawings are illustrative and symbolic of the present invention and there is no intention to indicate scale or relative proportions of the elements shown therein.

Figure 1:
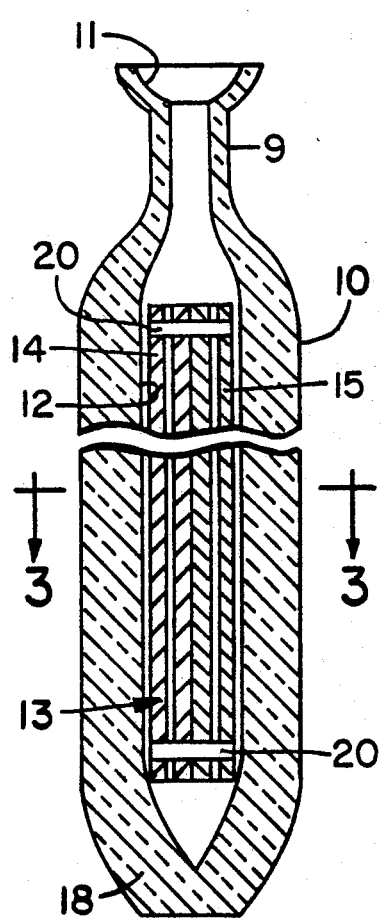
FIG. 1 is a cross-sectional elevation of a glass tube having a carbon member disposed in the longitudinal aperture thereof.
Figure 3:
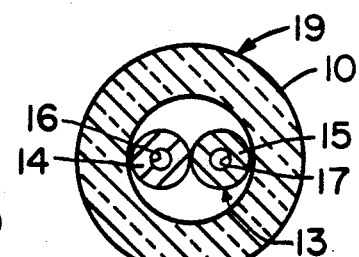
FIG. 3 is a cross-sectional view along lines 3—3 of FIG. 1.

Referring to FIGS. 1 and 3, there is provided a glass tube 10 having a longitudinal aperture 12 therein. Tube 10 may be formed in any way known in the art. Methods of forming tubes of high purity glass are taught in U.S. Pat. Nos. Re. 28,029; 3,884,550; 4,125,388, 4,286,978 and 4,629,485 all of which are hereby expressly incorporated herein by reference. One end of tube 10 is fused to a glass vacuum connection tube 9 having a spherical end surface 11 that is adapted to receive the ball-shaped end of a tube that is adapted to be connected to a vacuum source (not shown).

The softening point temperature of tube 10 should be lower than that of the optical fibers that are to be inserted therein. Suitable tube compositions are $SiO_2$ doped with 1 to 25 wt. % $B_2O_3$ and $SiO_2$ doped with at least 0.1 wt. % fluorine. Since it is also preferred that the tube glass have approximately a 0.3 %Δ refractive index drop from silica, a silica based tube glass preferably contains about 8 wt. % $B_2O_3$ or about 0.9 wt % fluorine or some combination thereof.

End 18 of tube 10 opposite vacuum connection tube 10 is initially open. An assembly 19 is formed by inserting into aperture 12 through that open end a hollow elongated carbon member 13, the shape and size of which are determined by the fibers that are to be connected to the resultant coupler. For example, if each end of the coupler is to be capable of receiving two optical fibers of predetermined diameter, then member 13 is shaped like two contiguous cylinders, the sizes of which are such that, after subsequent processing such as stretching, two optical fibers of that predetermined diameter will just fit into the aperture. It has been found that the optical fiber-receiving wells of the resultant coupler must be at least 1–2 μm greater in diameter than the fibers to be inserted therein. End 18 of tube 10 is then sealed by fusion of the glass as illustrated in FIG. 1.

Figure 2:
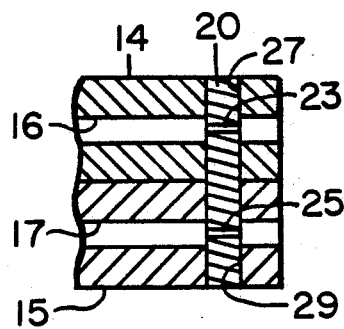
FIG. 2 is a cross-sectional view of the end portions of two pinned carbon tubes.

Member 13 may be formed of two carbon tubes 14 and 15 which are preferably formed of graphite. Longitudinal apertures 16 and 17, which can be formed in tubes 14 and 15 by drilling, permit the flow of oxygen through the tubes to facilitate their subsequent removal. The tubes can be pinned at both ends in the manner illustrated in FIG. 2. Holes 27 and 29 are drilled radially through carbon tubes 14 and 15, respectively, near the ends thereof. While tubes 14 and 15 are secured together with the axes of holes 27 and 29 aligned, carbon pin 20 is inserted through the holes. Any portion of pin 20 that extends beyond the surface of tube 14 or 15 can be removed. Bores 23 and 25 are then formed in pin 20 by inserting a drill bit through the ends of apertures 16 and 17, respectively. The opposite ends of tubes 14 and 15 can be similarly pinned.

Figure 4:
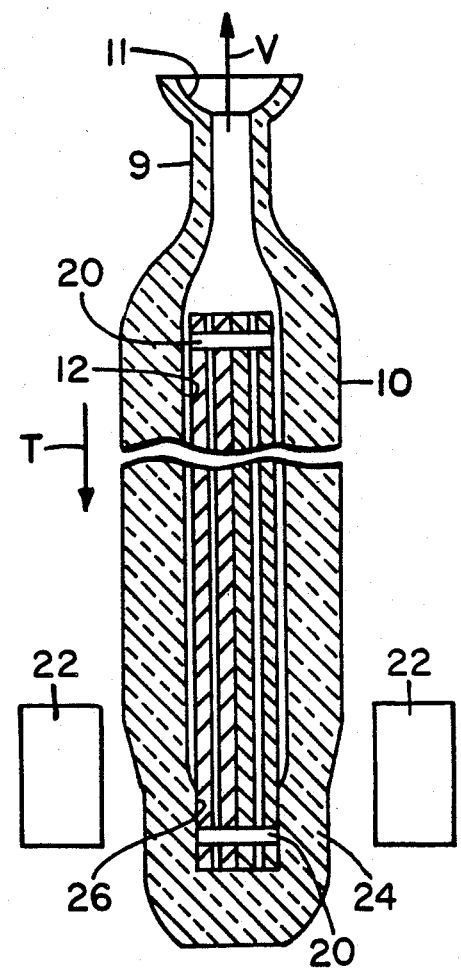
FIG. 4 is a cross-sectional view illustrating the collapsing step of the present invention.
Figure 6:
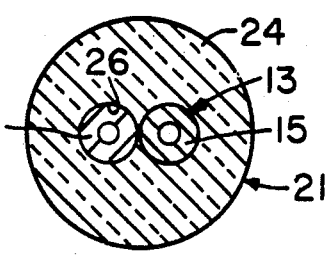
FIG. 6 is a cross-sectional view taken at lines 6—6 of FIG. 5 prior to removal of the carbon tubes.

As indicated by arrow V in FIG. 4, the end of tube 10 opposite sealed end 18 is connected to a source of vacuum. The interior of tube 10 within aperture 12 is thus subjected to the vacuum as are the whole of carbon tubes 14 and 15. As assembly 19 is traversed through the heater 22, as shown by arrow T, the glass tube softens and collapses around carbon tubes 14 and 15 to form composite body 21. The collapse of tube 10 is facilitated by the vacuum-induced pressure differential which exists across the wall thereof. The internal surface of glass tube 10 assumes the shape and dimensions of the exterior surface of carbon tubes 14 and 15 as illustrated by the collapsed portion 24 in FIG. 4. This is clearly illustrated in the cross-sectional view shown in FIG. 6 wherein the internal surface 26 of glass tube 10 has been precisely conformed to the exterior surfaces of carbon tubes 14 and 15. Even though tube 10 has been heated to the softening point of the glass material thereof, the integrity of carbon tubes 14 and 15 is maintained because of the vacuum to which they are subjected during this step of the method.

Figure 5:
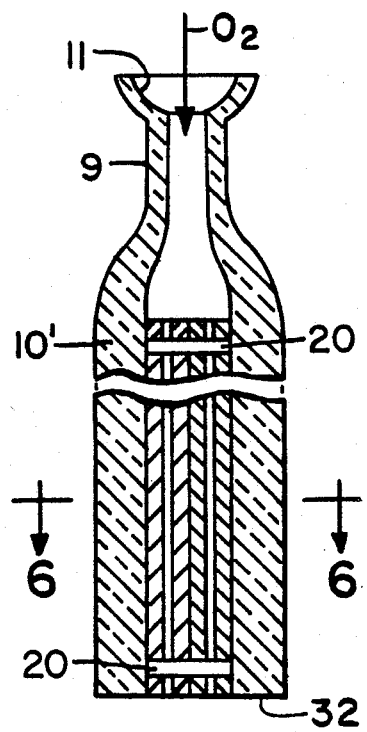
FIG. 5 is a cross-sectional illustration of the removal of the carbon tubes.

FIG. 5 shows glass member 10' entirely conformed to carbon tubes 14 and 15. After the assembly so formed is cooled, the sealed end thereof at surface 32 is removed. In this manner, the longitudinal apertures 16 and 17 of carbon tubes 14 and 15 are open at both ends of the assembly. As illustrated by the arrow labelled $O_2$, a source of oxygen or oxygen containing gas is connected in any known manner to the assembly so formed. While the oxidizing gas is flowing through through longitudinal apertures 16 and 17, the assembly is heated in a suitable furnace to a temperature less than the softening point of the glass of glass member 10'. Carbon tubes 14 and 15 are thus oxidized to CO or $CO_2$ which is vented from the furnace. Without apertures 16 and 17, the removal of the carbon material would be excessively prolonged. The longitudinal aperture that remains after the carbon burnout step precisely corresponds to the size and shape of carbon tubes 14 and 15; that aperture does not change in size or shape during the burnout step which takes place at a temperature below the softening point temperature of the glass tube.

Optical fibers, which are to be inserted into a connector, have very small diameters, eg. 125 $\mu$m. As stated previously, each of the tube apertures must have diameters of about 127 $\mu$m in order to have the capability of receiving such a 125 $\mu$m fiber. It is impractical, if not impossible, to form such small apertures by collapsing a tube 10 onto carbon rods having 127 $\mu$m diameters. Obviously, such small diameter carbon rods could not be provided with bores 16 and 17. Therefore, the preferred method employs carbon tubes which are larger in diameter than the final required aperture size, and the modified tube resulting from the carbon burnout step is drawn or stretched one or more times to reduce the aperture diameters to the required sizes. It is advantageous to add cladding material to the glass tube prior to each drawing step subsequent to the first drawing step.

FIG. 7 illustrates the drawing of modified tube 10' to form a precision capillary tube 30 which may be referred to as a mandrel if it is employed as a starting member for the deposition of glass soot which will be consolidated to form a layer of overcladding glass. As described in my U.S. Pat. No. 4,453,961, mandrel 30 can be formed in a conventional draw furnace wherein the tip of modified tube 10' is heated by carbon resistance heater 32 to a temperature that is slightly lower than the temperature to which it would be heated to draw a thin fiber therefrom. A temperature in the range of about 1700° C. to 1900° C. is suitable for borosilicate and fluorosilicate glasses. The bottom of tube 10' can be engaged by conventional drawing tractors (not shown), thereby causing mandrel 30 to be drawn in the direction of arrow D at a suitable rate. During the drawing process, aperture 34 is of smaller size but conforms in shape to aperture 26 of tube 10'.

In a preferred embodiment, mandrel 30 is drawn to a diameter such that the size of the double cylinder aperture 34 is larger than the fibers to which the resultant coupler is to be connected. Mandrel 30 is cleaned and mounted in a lathe where it is provided with a coating 38 of glass particles from burner 40 as shown in FIG. 8.

The resultant composite preform 42 is consolidated to form a precision tube by gradually inserting the preform into a consolidation furnace. The overcladding glass preferably has the same refractive index as original glass tube 10. Thus, coating 38 could have the same refractive index as tube 10, but the compositions could be different. However, the refractive indices of these two glass regions can be most easily matched by matching the composition of the overcladding to that of the original capillary tube 10. If, for example, tube 10 is formed of fluorosilicate glass, coating 38 could consist of silica particles and a sufficient amount of fluorine-containing gas could be present during the consolidation of coating 38 to form a glass layer having a composition identical to that of original tube 10. The resultant consolidated glass body is again drawn to reduce the diameter thereof in the manner described in connection with FIG. 7. After this final draw operation, the size of each cylindrical aperture is only a few microns larger than the diameter of the fiber that is to be inserted therein.

Obviously, the precision tube could be formed in a single draw step or by overcoating and drawing more than the number of times specified in the preferred embodiment.

A precision capillary tube having two contiguous apertures could also be formed by core drilling oversized longitudinally-extending holes in a glass rod. If the holes are spaced by a small distance, the wall therebetween can be removed by etching. The resultant tube can be drawn as described above to reduce the diameter of the aperture.

A precision tube formed by one of the aforementioned processes is divided into lengths 1 that are suitable for forming optical fiber couplers. During the subdividing process, portions of the precision aperture, which will be located at the ends of the couplers, can be enlarged to facilitate the insertion of optical fibers into the aperture. A fluid such as air is supplied to the aperture of the precision tube to create therein a pressure in excess of ambient pressure. When a portion of the length of the precision tube is heated to the softening point of the glass material, the fluid pressure within the aperture causes it to expand at the heated portion by displacing the glass. In this manner, a bubble is formed within the aperture of the tube. A more uniform and concentric bubble can be formed by rotating the precision tube while directing a flame thereon or by employing a ring burner that heats the entire circumference of the tube. The procedure is repeated at intervals spaced by the distance 1. The precision tube is scored along the exterior surface thereof at about the center of each bubble and severed along the score lines. This produces a coupler tube between each pair of bubbles. The coupler tube consists of a portion of the precision tube, the longitudinal aperture of which has a tapered aperture at each end.

FIG. 9 shows a coupler tube 44 formed as described above. Extending longitudinally through tube 44 is a precision aperture 46 which is connected to tube ends 48 and 49 by tapered apertures 50 and 51, respectively. Precision aperture 46 is precisely shaped in the form of two contiguous cylindrical apertures the diameters of which are only slightly larger than the outside diameters of the optical fibers. The diameters of the contiguous cylindrical apertures are preferably only one or two microns larger than the diameters of such optical fibers.

The ends of two short lengths of optical fiber 52 and 53 are carefully cleaved to form endfaces which will be suitable for end-to-end fiber connection. The fibers, each of which conventionally have a core and cladding, are selected to match the optical fibers with which the resultant coupler will be connected. The fibers are cleaned to prevent seed formation in the subsequent coupler forming steps and are then longitudinally centered within aperture 46. Another piece of fiber can be used to position the fibers within the aperture. Fibers 52 and 53 are shorter than aperture 46 by a length sufficient to ensure that the remaining open end portions of aperture 46 are sufficiently long to receive system optical fibers in good axial alignment with fibers 52 and 53.

The assembly 55 formed by inserting fibers 52 and 53 into tube 44 is then placed in a suitable mounting device or holder 56, such as a tinners clamp. A tube 58 connected to a source of vacuum may be placed around the end of capillary tube 44. This vacuum connection does not cause the fibers to move axially in the tube.

In accordance with one embodiment of the present invention, the midregion 59 of tube 44 is heated and collapsed onto the central portions of fibers 52 and 53. It is noted that midregion 59 is therefore shorter than the lengths of fibers 52 and 53. The central portion of midregion 59 is then heated and stretched to bring the fiber cores closer together along a distance sufficient to accomplish a predetermined type of coupling. This is accomplished by first heating midregion 59 to the softening point of the glass tube 44 by means of heat source 60, which may comprise an oxygen-hydrogen burner, a gas-oxygen burner, or the like. Burner 60 may traverse midregion 59 in the direction of arrow 61 toward vacuum source V or it may be located in the center of midregion 59 and remain stationary. It is an optional feature of the tube collapse step to apply a vacuum source to both ends 48 and 49 of tube 44, in which case the direction of burner traverse is immaterial. The step of subjecting midregion 59 to heat source 60 causes the material of tube 44 at midregion 59 to collapse about the central portion of fibers 52 and 53 (see FIG. 10) to form a coupler preform 62 having solid midregion 63. The collapsed midregion is preferably free of air lines, bubbles, or the like.

Coupler preform 62 is removed from holder 56 and placed in a precision glass working lathe illustrated by members 66 and 67 in FIG. 11. The solid midregion 63 of FIG. 10 is then subjected to the flame from burner 70 until the central portion of the solid midregion 63 is heated to the softening point thereof. Stretching only the central portion of the collapsed midregion ensures that the coupling region of the fibers will be embedded in the matrix glass of the capillary tube and that the aperture surrounding the unstretched sections of fibers 52 and 53 will be large enough to receive system optical fibers. The flame is removed and the softened portion of midregion 63 is pulled or drawn down by action of the glass working lathe to reduce the diameter thereof as illustrated by region 72 of FIG. 11. The diameter of drawn down region 72 is a function of various fiber and operational parameters. The ratio of the drawn down diameter of region 72 to the starting diameter of midregion 63 (the draw down ratio) is determined by the optical characteristics of the particular device being made. It is well known that such draw down ratios are a function of the ratio of the signal split between the fibers, the refractive index difference between the tube and the fiber cladding, the outside diameter of the fiber cladding, the diameter of the fiber core, signal operating wavelength, cutoff wavelength, the tolerable excess loss, and the like. A preferred range of draw down ratios is between about ½ to 1/20; however, couplers can be made having draw down ratios outside this range.

As illustrated in FIG. 11, that portion of the coupler preform that is held by glass working lathe member 66 is held stationary while that portion of the coupler preform that is held by lathe member 67 is traversed in the direction of arrow 74 to obtain drawn down region 72. In practice, such a pull down or draw down takes approximately ½ second. Alternative drawing techniques involve the movement of lathe member 66 in the same direction as that in which member 67 moves or in a direction opposite that in which member 67 moves.

The coupler preform would not need to be rotated if the draw down portion of midregion 59 were heated by a ring burner which would uniformly heat that region around its periphery. The draw down method would otherwise be the same. In the embodiment wherein a ring burner is employed, the step of collapsing tube 44 onto fibers 52 and 53 and the step of forming drawn down region 72 may be performed on the same apparatus. If the collapse and stretch operations are performed in the same apparatus, it is preferred that tube 44 be allowed to cool prior to being reheated for the stretch step. This temporal separation of the two steps results in better process control and therefore better reproducibility. Furthermore, tube 44 can be disposed in any orientation including vertical and horizontal during the tube collapse and/or drawing operations.

After the draw down, the open end portions 77 and 78 of the precision aperture are available to receive system optical fibers. Fiber 80 is shown in FIG. 11 in the lower portion of aperture end portion 78 in end-to-end connection with the adjacent endface of the unstretched end of fiber 53. When two system optical fibers are inserted into each end of coupler 82, optical power propagating in one fiber at one end thereof can be coupled to one or both of the fibers at the opposite end. During its use as a coupler, glue is generally applied to the tapered apertures after the system fibers have been inserted into aperture end portions 77 and 78.

The coupler can be further processed by packaging, not shown, for additional stiffness. For example, a stainless steel tube could be glued to at least the central portion of the coupler so that it extends over stretched region 72. The steel tube preferably does not extend over the aperture end portions 77 and 78 so that UV light can be directed through the coupler sidewalls onto the glue used to secure fibers to the coupler.

In accordance with the above-described embodiment, the steps of collapsing and stretching are separately performed. This is advantageous since more control can be exerted over each step if the tube is allowed to cool prior to heating it for the stretching operation. A central portion of the solid collapsed midregion can be stretched, thereby keeping the stretched portions of the optical fibers completely enclosed in the matrix glass of the tube. This improved hermeticity is advantageous since it prevents the stretched portions of the fibers from being adversely affected by water and the like, a factor that can adversely modify the optical characteristics of the coupler.

Low loss couplers could also be made by an alternative embodiment wherein the steps of collapsing midregion of the tube onto the fibers and drawing or stretching the central portion of the midregion are performed in a single heating operation. In accordance with this modified embodiment, the fibers are inserted into the precision tube and the resultant assembly is placed in a precision glass working lathe as described above. A flame is applied to a small portion of the midregion until the softening point of the materials is reached, and the heated section is stretched.

The disadvantages of this embodiment are a reduction in hermeticity and an adverse affect on manufacturing reproducibility, i.e. stretching to a predetermined length does not always result in the desired coupling characteristics. However, this embodiment has some advantages over other methods. The method is simpler in that it can be performed without vacuum and the separate tube collapse step is eliminated.

The amount of stretching to which the capillary tube must be subjected to achieve a given type of coupling is initially determined by inserting temporary optical fiber pigtails into aperture end portions 77 and 78 of a collapsed coupler preform. Light energy is injected into one input fiber and the output power is monitored at the output fibers during the stretch operation. To accomplish this purpose, one of the fiber pigtails is aligned with a light source, and both pigtails at the other end of the device are coupled to light detectors. The predetermined ratio of the dynamic output powers can be used as an interrupt to cause lathe member 67 to stop pulling the sample. After having determined the proper stretching distance to achieve predetermined coupling characteristics, the apparatus can be programmed to move member 67 that proper stretching distance during the fabrication of subsequent couplers that are to have said predetermined characteristics.

It is conventional practice to monitor output signals to control process steps in the manufacture of optical devices as evidenced by U.S. Pat. Nos. 4,392,712 and 4,726,643, U.K. Pat. Application No. GB 2,183,866 A and International Publication No. WO 84/04822. Furthermore, computers are often employed in feedback systems which automatically perform such monitor and control functions. A suitably programmed PDP 11-73 micro-computer can be utilized to perform these functions. The timing sequences that have been used in the fabrication of a particular type of coupler can be entered in a separate multiple command file that the computer recalls at run-time. The collapse and stretch steps that are required to make that particular coupler can be executed in succession by the computer on each coupler preform to reproducibly manufacture couplers. The process parameters that can be controlled by the computer to ensure coupler reproducibility are heating times and temperatures, flow rates of gases, and the rate at which the lathe member pulls and stretches the coupler preform. Reproducibility is also a function of the resolution of the motor apparatus that moves member 67.

Although the foregoing description has been related to couplers made from pairs of optical fibers, it will be evident that the invention is also applicable to couplers made from more than two fibers.

The following specific example utilizes a glass capillary tube formed by depositing silica particles on a mandrel to form a porous, cylindrically-shaped preform. The mandrel was removed and the porous preform was consolidated in an atmosphere of helium, chlorine and a sufficient amount of $SiF_4$ to form a tubular glass body of $SiO_2$ doped with 1 wt. % F. A vacuum connection tube was fused to one end of the glass tube.

Axial bores 2 mm in diameter were drilled in two 6.5 mm O.D. graphite rods. The resultant graphite tubes were pinned together at both ends and were inserted into the remaining end of the capillary tube opposite the vacuum connection tube. Said remaining end was then sealed by fusion. The vacuum connection tube was connected to a source of vacuum, and the resultant assembly 20 was lowered into a carbon resistance Astro Furnace at a rate of about 10 mm/minute. The leading edge of the assembly was the sealed end. As the assembly was heated to a temperature of approximately 1760° C., the glass tube collapsed around the carbon tubes.

After the entire length of the glass tube collapsed about the carbon tubes, the resulting composite body was cooled and the sealed end was severed by a diamond saw. The composite body was lowered at a rate of 1 mm/minute into a furnace maintained at 1250° C. while oxygen was flowed through the center holes of the carbon tubes. This removed the carbon tubes by oxidation to form a large aperture, precision glass tube having an aperture precisely the same shape and size as the starting carbon tubes, i.e. an aperture having the combined shape of two contiguous cylindrical apertures.

The tubular glass body was drawn to an outside diameter of about 6.0 mm in order to reduce the diameters of the double cylinder apertures to about 1.5 mm. The resultant mandrel was then overcoated with a layer of $SiO_2$ doped with 0.9 wt. % F in order to obtain the desired outside diameter of about 36 mm. This glass overcoating was applied by a particle deposition/consolidation process similar to that used to form the original glass capillary tube. The overclad tubular glass body was drawn to an outside diameter of about 2.8 mm in order to reduce the diameters of each of the double cylinder apertures to about 127 $\mu$m.

One end of the resultant capillary tube was attached to a source of air pressure, and while the tube was rotated, a flame was directed onto the tube at 5.1 cm intervals. A bubble was formed at each region of the tube softened by the flame. The tube was scored at the center of each bubble and severed at each score line to produce a plurality of precision aperture capillary tubes having appeared apertures at each end thereof. Each such coupler tube had an outside diameter of about 2.8 mm, a length of 5.1 cm and a precision longitudinal aperture having the shape of two contiguous apertures, each having a diameter of about 127 $\mu$m.

Two single-mode optical fibers having an outside diameter of 125 $\mu$m were each cut to a length of approximately 2.5 cm. The fibers were grasped by tweezers, dipped in boiling ammonia solution, and then inserted into the aperture of the precision tube. Another piece of optical fiber was used to center the fibers in the tube. The assembly so formed was mounted in a tinner's clamp that was modified by cutting away the central portion and one end portion of the clamping region such that when the coupler assembly was mounted, midregion 59 and end surface 49 were exposed. A tube connected to a vacuum source was connected to the exposed end of the capillary tube to evacuate longitudinal aperture 46.

The midregion 59 of tube 44 was then heated to the softening point of the fluorosilicate glass by an oxygen-hydrogen burner, thereby causing the glass to began to collapse around the fibers. The flame was directed at one end of the midregion and then traversed through the midregion in the direction of the vacuum source so that the material of the tube collapsed about the central portion of the fibers over a length of about 1.0 cm. This technique resulted in the formation of a solid midregion which had no air lines or bubbles.

The assembly so formed was removed from the modified tinner's clamp and placed in a precision glass working lathe. The lathe was a Heathway glass working lathe having a computer controlled pull down or drawn down mechanism. The flame from an oxygen-hydrogen gas burner was applied to a small portion of the solid midregion until the softening point of the materials was reached, whereupon the computer controlled pull down apparatus stretched the heated section for an interval of approximately 0.5 second. The diameter of the pulled down section was approximately 0.7 mm.

Various types of couplers were made the above-described process, e.g. WDM couplers, 3 dB couplers at 1300 nm and 3 dB couplers at 850 nm. The coupling characteristics and loss were determined by connecting the coupler to test equipment by gluing the connecting fiber pigtails into the wells at the unclosed ends of the precision apertures. The measured losses included losses due to the connections of the fiber pigtails to the couplers. Total insertion loss (including connection loss) was typically about 1.2 dB and was as low as 0.34 dB.

I claim:

1. A method of making a fiber optic coupler comprising the steps of
    providing a glass coupler preform tube having first and second opposite end portions, a midregion, and a longitudinal aperture extending therethrough, the cross-sectional shape of said aperture being suitable for receiving a plurality of optical fibers in predetermined azimuthal locations,
    disposing within said longitudinal aperture at least two glass optical fibers, the ends of said fibers being disposed in those portions of said aperture between said midregion and the ends of said aperture,
    heating the midregion of said tube to collapse said midregion around the central portions of said fibers, and
    drawing the central portion of said midregion to reduce the diameter thereof.

2. A method in accordance with claim 1 wherein the step of providing a glass tube comprises providing a glass tube having a longitudinal aperture, the cross-sectional shape of which approximates that of a plurality of contiguous cylindrical apertures.

3. A method in accordance with claim 2 wherein the step of providing a glass tube comprises providing a glass rod and core drilling a plurality of adjacent apertures therethrough.

4. A method in accordance with claim 3 wherein the step of core drilling comprises core drilling a plurality of apertures, each two adjacent apertures being separated by a thin wall, said method further comprising the step of removing said thin wall.

5. A method in accordance with claim 2 wherein the step of providing a glass tube comprises providing a glass tube having an aperture therethrough, inserting a plurality of carbon rods into said glass tube, evacuating said tube, heating said tube to collapse it onto said carbon rods, removing said carbon rods, thereby forming in said tube a precision aperture shaped like a plurality of contiguous apertures, and drawing said glass tube to reduce the cross-sectional size of said aperture.

6. A method in accordance with claim 5 further comprising the step of securing together the ends of said carbon rods prior to inserting them into said glass tube.

7. A method in accordance with claim 5 further comprising the step of forming an axial bore through each of said carbon rods.

8. A method in accordance with claim 2 wherein the step of providing a glass tube comprises providing a glass tube having an aperture therethrough, inserting a plurality of carbon rods into said glass tube, evacuating said tube, heating said tube to collapse it onto said carbon rods, removing said carbon rods, thereby forming in said tube a precision aperture shaped like a plurality of contiguous apertures, drawing said glass tube to reduce the cross-sectional size of said aperture, overcoating said stretched glass tube with a layer of glass, and thereafter drawing the resultant overcoated tube to further reduce the cross-sectional dimension of said aperture.

9. The method of claim 1 further comprising the step of cleansing the uncoated portion of said optical fibers prior to disposing them within said longitudinal aperture.

10. The method of claim 1 wherein the step of heating comprises heating the central portion of said tube to at least the softening point of the material thereof to collapse the central portion of said tube around said fibers, thereby forming a solid midregion, and thereafter heating at least a portion of said solid midregion to at least the softening points of the materials of said glass fibers and said tube and drawing at least a portion of said midregion.

11. The method of claim 1 further comprising the step of creating a lower pressure within said aperture than at the outer surface thereof prior to the step of heating said tube to collapse the central portion thereof.

12. The method of claim 11 further comprising the step of evacuating said aperture prior to the step of heating said tube to collapse the central portion thereof.

13. The method of claim 1 wherein the step of heating comprises heating one end of said midregion to the softening point of the material of said tube and traversing said heat source along said midregion in a direction parallel to the longitudinal axis of said tube, thereby forming a solid midregion, 14. An optical fiber coupler that is adapted to be connected to a plurality of system optical fibers of predetermined diameter, said coupler comprising
    an elongated glass body having a solid midregion and first and second opposite end portions which respectively extend from said midregion to the first and second ends of said body.
    first and second longitudinal apertures respectively extending from said first and second ends of said body to said solid midregion, said longitudinal apertures having a cross-sectional shape that is a composite of a plurality of contiguous cylindrical apertures, and
    at least two glass optical fibers, each having a core and cladding, each of said fibers extending through said midregion of said body and terminating in a respective one of said apertures between said midregion and the first and second ends of said body, said midregion of said body being in intimate contact with said fibers,
    the central portion of said midregion being of smaller diameter than the remainer of said midregion, the cores of said fibers being more closely spaced in said central portion than in the remaining portions of said midregion, the sections of said apertures between the ends of said fibers and the first and second ends of said body forming wells into which said systems optical fibers can be inserted for connection to said coupler.

* * * * *